United States Patent [19]

Goddijn

[11] 4,229,682

[45] Oct. 21, 1980

[54] ELECTRONICALLY COMMUTATING MOTOR

[75] Inventor: Bernardus H. A. Goddijn, Eindhoven, Netherlands

[73] Assignee: U.S. Philips Corporation, New York, N.Y.

[21] Appl. No.: 913,305

[22] Filed: Jun. 7, 1978

[30] Foreign Application Priority Data

Aug. 30, 1977 [NL] Netherlands ......................... 7709518

[51] Int. Cl.² .......................................... H02K 29/02
[52] U.S. Cl. .................................. 318/254; 318/331; 318/439; 310/49 R; 318/138
[58] Field of Search ............... 318/439, 138, 254, 331, 318/459; 310/49

[56] References Cited

U.S. PATENT DOCUMENTS

| | | | |
|---|---|---|---|
| 3,229,182 | 1/1966 | Kubler | 318/331 |
| 3,333,172 | 7/1967 | Brailsford | 318/138 |
| 3,979,616 | 9/1976 | Stechmann | 310/49 R |
| 3,991,332 | 11/1976 | Kawamura et al. | 310/49 R |

Primary Examiner—J. V. Truhe
Assistant Examiner—John W. Redman
Attorney, Agent, or Firm—Thomas A. Briody; William J. Streeter; Bernard Franzblau

[57] ABSTRACT

An electronically commutating motor having a phase winding connected in at least one of the branches of a bridge circuit. A comparator measures the voltage across one of the diagonals of the bridge and switches the voltage across the other bridge diagonal as a function of the polarity of the first-mentioned voltage.

15 Claims, 17 Drawing Figures

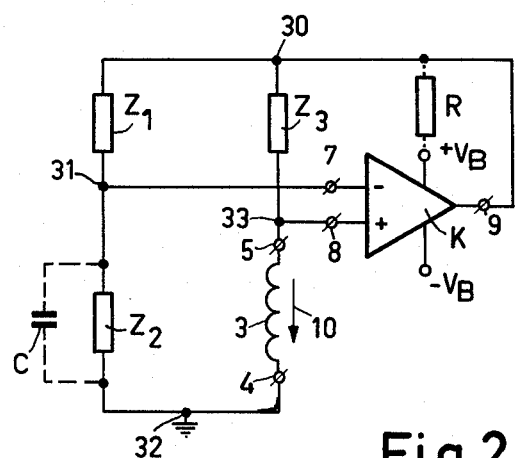
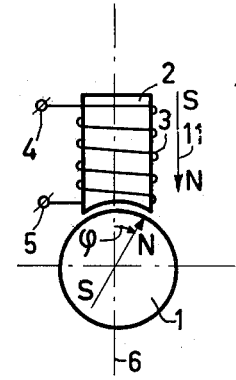
Fig.2  Fig.1
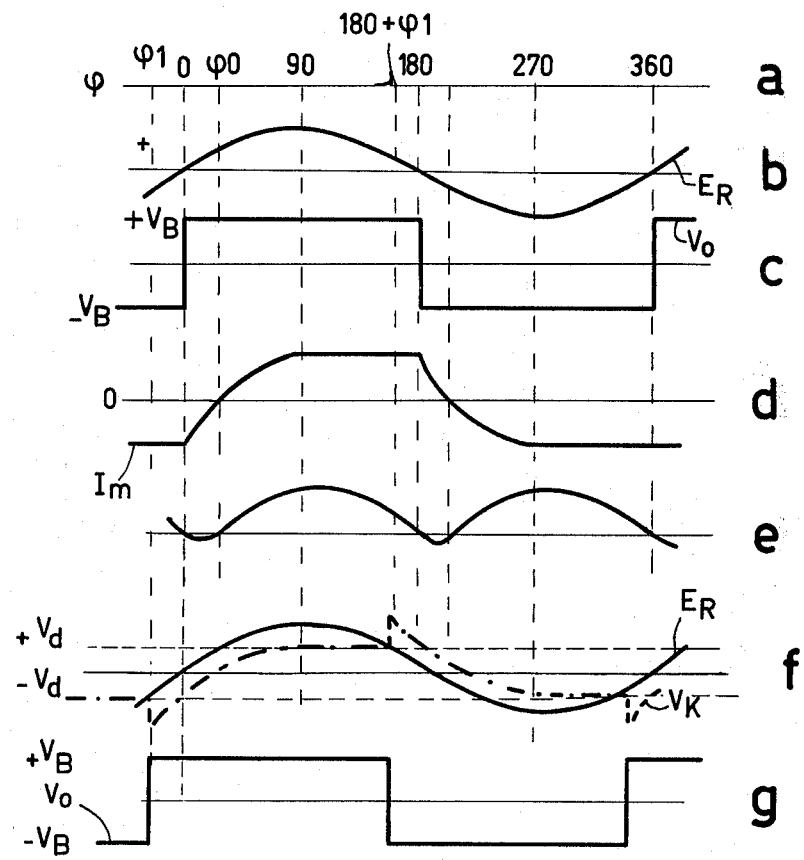
Fig.3

ELECTRONICALLY COMMUTATING MOTOR

The invention relates to an electronically commutating motor.

When motors are energized from a direct voltage supply, means are required to switch this direct voltage across the phase windings as a function of the rotor position in order to produce a rotary field in the air gap between the stator and rotor. In electronically commutated motors the switching is effected electronically. In order to detect the rotor position use is generally made of magneto-sensitive elements such as Hall generators. It is obvious that the use of such sensors constitutes a drawback.

From U.S. Pat. No. 2,890,400 a single-phase rotating system is known which employs an auxiliary coil as a sensor. The voltage induced in this coil is applied to an amplifier so as to apply a current pulse to a phase winding as soon as this voltage exceeds a specific threshold. This motor also has a drawback in that an auxiliary coil is required and that the motor is driven with short current pulses in synchronism with the rotor movement.

It is an object of the invention to provide an electronically commutating motor which requires no additional detectors and which can be realized with a minimum of components.

In order to accomplish this object the invention is characterized by a bridge circuit having a first impedance between a first point and a second point, a second impedance between the second point and a third point, a third impedance between the third point and a fourth point, and a fourth impedance between the fourth point and the first point. A comparator means has first and a second inputs connected to the second and the fourth points respectively, and an output for comparing the voltage across the second and fourth points and, as a function of an output signal of said comparator means, energizes the bridge circuit between the first and the third points. At least one of the first and third impedances comprises a phase (stator) winding of a motor.

Owing to this step no additional detector is needed. The phase winding itself now functions as a rotor-position detector. By applying the energizing voltage for said phase winding via a bridge, the polarity and the amplitude of said energizing voltage does not affect the detection.

If a motor is used whose phase winding has a self-inductance which is not negligible, either the second or the fourth impedance in the bridge should comprise a self-inductance. However, because the impedance of the phase winding is frequently highly temperature sensitive, problems may arise.

An embodiment of an electronically commutating motor in accordance with the invention which does not have this problem is characterized in that the motor comprises at least one pole pair with asymmetrical air gaps between stator and rotor, and that each pole of said pole pair is provided with a winding, the first or third impedance comprising the one winding and the second or fourth impedance the other winding.

In such a motor, which is inter alia known from German Patent Application No. 1438569, which has been laid open for public inspection, the rotation electromotive forces induced in the two windings are in phase, but are not exactly equal in respect of amplitude owing to the asymmetric stray fields. As a result of this, a measurable voltage difference appears at the inputs of the comparator means, enabling commutation. Thus, an additional self-inductance may be dispensed with and the two remaining impedances in the bridge may be constituted by resistors. Thus, by means of a motor of the said type and, two resistors and a comparator, a self-commutating motor is obtained using very few components.

A further advantageous embodiment in accordance with the invention is characterized in that the motor is of the two-phase type, the first or third impedance comprising the winding corresponding to the one phase and the second or fourth impedance comprising the winding corresponding to the other phase.

As in the case of a two-phase motor the electromotive forces which are induced differ in phase, commutation is then also possible and the same advantages are obtained as in the last but one embodiment.

A further embodiment of an electronically commutating motor in accordance with the invention is characterized in that the motor is a reluctance motor and that said comparator means energize the bridge circuit in such a way that in the stationary condition an energizing voltage appears across the bridge if the voltage between the fourth and second point exhibits a first polarity and that the bridge is then energized in the stationary condition if the voltage across the fourth and second point exhibits a second polarity.

Thus, the steps in accordance with the invention can also be used in reluctance motors which are insensitive to the polarity of the energizing voltage.

In the unenergized condition no voltage is induced in the phase winding of a reluctance motor so that no commutation would take place. A technique to avoid this problem is characterized in that the bridge circuit is connected to a voltage-carrying point via a resistor in such a way that the phase windings included in the bridge circuit receive a measuring current when the bridge circuit is non-energized.

As the self-inductance of the phase winding depends on the rotor position, said measuring current still induces a voltage which is dependent on the rotor position in the non-energized condition, so that commutation is possible.

As the commutation instants are determined by the voltages induced in the phase windings and it may be desirable to shift these instants, it is advantageous that the comparator means comprise a time delay device for transferring said output signal to the bridge circuit with a delay.

In this respect it is advantageous that the time delay device causes a variable time delay.

Furthermore it is of advantage that switching means are provided for inverting the polarity of the energizing voltage of the bridge circuit so that the motor is braked in a self-synchronizing manner.

Indeed, owing to the inversion of the energizing voltage, said voltage always has the wrong polarity for the driving, which causes self-synchronized braking.

Preferably, this inversion rendered possible in that said switching means comprise a cross-over switch between the second and fourth point and the first and second input of the comparator means for cross-wise interchanging the connections between the second and fourth point and the first and the second input of the comparator means respectively.

Stepping motors are energized stepwise for accurate positioning. For a rapid displacement of a load it may be desirable to have the motor rotate continuously. This can be achieved successfully by applying the principles in accordance with the invention to the motor. In this respect it is advantageous to provide means for controlling the energizing voltage across the bridge circuit independently of the voltage between the second and the fourth points.

Thus, the self-synchronisation circuit is combined with a step control circuit.

Such a step may be further characterized in that said means for controlling the energizing voltage comprise a switch for interrupting the connections between the second and fourth points respectively and the first and second inputs of the comparator means respectively and connecting said first and second inputs to a control circuit for controlling the energizing voltage across the bridge circuit.

The invention will now be described in more detail with reference to the drawing, in which, FIG. 1 schematically shows a single-phase motor.

FIG. 2 illustrates the steps in accordance with the invention applied to a motor in accordance with FIG. 1, FIGS. 3a–3g show some signal waveforms in explanation of FIG. 2, FIG. 4 schematically shows a single-phase motor with a divided winding and asymmetrical air gaps, FIG. 5 illustrates the steps in accordance with the invention applied to the motor in accordance with FIG. 4, FIG. 6 schematically shows a two-phase motor, FIG. 7 illustrates the steps in accordance with the invention applied to the motor in accordance with FIG. 6, FIG. 8 shows a diagram in explanation of FIG. 7.

Figure 4:
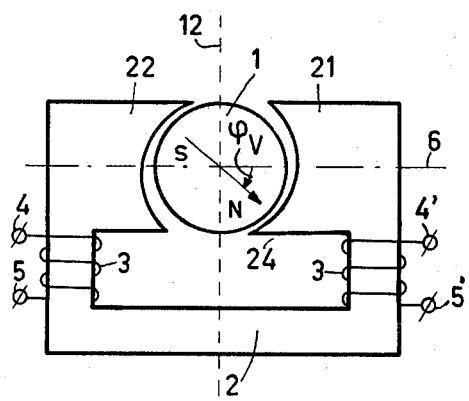

FIG. 1 shows a single-phase motor in simplified form. This motor has a permanent-magnetic rotor 1 with a magnetisation as shown. The stator has a magnetic circuit 2 surrounded by a coil 3 with terminals 4 and 5. The position of the rotor 1 relative to the stator is indicated by an angle $\phi$, which is the angle between the radial direction of magnetisation of the rotor and the axis of symmetry 6 of the stator, as is shown in FIG. 1.

The stator coil 3 is included in an energizing circuit which is shown in FIG. 2. This circuit comprises a bridge circuit with two parallel branches between points 30 and 32. The one branch consists of the series connection of the impedances $Z_1$ and $Z_2$ and the other of the series connection of an impedance $Z_3$ and the stator coil 3. The junction point 31 between the impedances $Z_1$ and $Z_2$ is connected to an inverting input 7 of a comparator K, whose non-inverting input 8 is connected to the junction point 33 between the impedance $Z_3$ and the stator coil 3. The output voltage of the comparator K is applied across the bridge, for example by connecting an output 9 of the comparator K to the junction point 30 between the impedances $Z_1$ and $Z_3$ and connecting the junction point 32 between the impedance $Z_2$ and the stator coil 3 to the ground point of the circuit. It is alternatively possible to include the bridge between two complementary outputs of a comparator. The output voltage of the comparator may assume values substantially equal to $+V_B$ or $-V_B$ depending on the voltages at the inputs 7 and 8 because the comparator is energized by these voltages.

The voltage across the stator coil 3 may be divided into two components $E_M$ and $E_R$, $E_M$ being the voltage across the stator coil 3 as a result of the impedance $Z_m$ of said coil with a stationary rotor 1 and $E_R$ being the voltage which is to be attributed exclusively to the rotation of the rotor 1. This rotation voltage $E_R$ is a voltage which, in the case of a permanent magnet rotor, is induced by said permanent magnet rotor and, in the case of a reluctance rotor, the voltage across the coil 3 which is produced because the self-inductance of said coil 3 exhibits a component which depends on the rotor position. In specific types of motors it is also possible that a combination of the two rotation voltages occurs.

If the bridge is balanced with the rotor stationary, i.e. if $Z_1 Z_m = Z_2 Z_3$, the rotation voltage $E_R$ appears across the inputs 7 and 8 of the comparator K when the rotor rotates. In this respect it is to be noted that in the case of a reluctance motor $Z_m$ is that portion of the natural impedance of the stator coil 3 which is independent of the rotor position $\varphi$.

In FIG. 3a the rotor position $\varphi$ is plotted and in FIG. 3b the rotation voltage $E_R$ is shown as a function of this angle in the case of a rotor 1 which rotates clockwise. The direction of this rotation voltage is then as indicated by the arrow 10 in FIG. 2. For a positive rotation voltage $E_R$ the voltage at the input 8 of the comparator K is consequently positive relative to the voltage at input 7 and thus the output voltage $V_0$ at output 9 is substantially equal to $+V_B$. This voltage $V_0$ is shown in FIG. 3c.

At this positive voltage $E_R$, i.e. for $\varphi$ between 0° and 180°, the output voltage $V_0$ of the comparator is positive and the stator field is oriented as indicated by the arrow 11 in FIG. 1. As a result of this, the rotor will advance to the stable position $\varphi = 180°$. Owing to the speed of the rotor the position $\varphi = 180°$ will be overshot. In this position the polarity of the rotation voltage $E_R$ changes and thus that of the voltage $V_0$, so that the direction of the stator field is reversed and the rotor is driven towards the next stable position $\varphi = 360°$. Thus a self-commutating d.c. motor is obtained.

The motor of FIG. 1 energized in accordance with FIG. 2 can rotate both in an anticlockwise and a clockwise direction. In either case a deviation from the position $\varphi = 0°$ produces a positive rotation voltage $E_R$ and consequently a positive energisation $V_0$. In principle, the motor can rotate at any speed and the speed is established depending on the load and the applied voltage.

FIG. 3d represents a current $I_m$ through the coil 3. As the motor impedance comprises a self-inductance, it is not a squarewave signal like the voltage $V_0$. After commutation ($\varphi = 0°$, 180°, 360° ...) the motor current $I_m$ varies exponentially and the zero passages of the motor current occur at relative rotor positions $\varphi$ which are shifted by an angle $\varphi_0$ relative to the rotor positions $\varphi$ in the case of commutation of the voltage $V_0$. The angular error $\varphi_0$ is proportional to the speed of the motor and will therefore be of significance especially at high speeds and in the case of motors with a comparatively high self-inductance. The effect of said self-inductance can be reduced by selecting a resistor for the impedance $Z_3$ with a value which is high relative to the impedance constituted by the self-inductance of the stator coil 3 at the desired maximum speed of the rotor, which however is attended by a comparatively high voltage loss, which can be prevented by employing current control.

The effect of the angular error $\phi_0$ may be explained with reference to FIG. 3e. This Figure schematically represents the torque which is exerted by the rotor 1 as a function of the rotor position $\varphi$. For $\varphi_0 < \varphi < 180°$ the motor current $I_m$ is positive and the torque is positive, and for $0° < \varphi < \varphi_0$ the motor current $I_m$ is negative and the torque is negative. For $180° < \varphi < 360°$ this relationship is just the other way round. As a result of this, the torque is negative for $n \times 180° < \varphi < n \times 180° + \varphi_0$, where $n = 0,1,2,3, \ldots$, so that owing to the angular error $\varphi_0$ the average torque per revolution at a specific speed is lower than the maximum torque ($\varphi_0°0$) obtainable at the said speed.

FIG. 2 illustrates a step for reducing the angular error $\varphi_0$ electronically. For this purpose a capacitor C is included in parallel with the impedance $Z_2$. In addition, an offset voltage $V_K$ is introduced into the bridge circuit in such a way that with a positive bridge voltage $V_0$ and stationary rotor the voltage between input 7 and input 8 of the comparator K is $+V_d$. If the voltage $V_0$ for $< \varphi < \varphi_1$ (FIG. 3g) is $-V_B$, the offset voltage $V_K$ of the bridge is $-V_d$. The output voltage of the comparator K then changes to $+V_B$ if the rotation voltage $E_R$ is equal to $-V_d$ (FIGS. 3f and 3g). Without the capacitor C the offset voltage $V_K$ would become equal to $+V_d$ and the comparator K would change the bridge voltage $V_0$ again to $-V_B$ and back again to $+V_B$. The bridge then starts to oscillate. As the capacitor C is negatively charged, the offset voltage $V_K$ becomes highly negative upon change over when $\varphi = \varphi_0$ and is then charged exponentially until the offset voltage $V_K$ equals $+V_d$. As a result of this, the output voltage $V_0$ of the comparator K remains positive upon change over when $\varphi = \varphi_1$. The same occurs, though in an opposite sense, for $\varphi = 180° + \varphi_1$. Thus, owing to this step the angular rotor positions at which commutation takes place can be shifted through an angle $\varphi_1$ in a negative direction in order to compensate for the angular error $\varphi_0$.

The time delay between the zero passages of the motor current $I_m$ and the voltage $V_0$ is not the only cause of the angular error $\varphi_0$. The rotation voltage $E_R$ (FIG. 3b) is applied to the comparator input 8 via a voltage divider consisting of the stator coil 3 and the impedance $Z_3$. Owing to the self-inductance in this voltage divider this also gives rise to a time delay, which is substantially equal to the angular error $\varphi_0$. This contribution to the angular error can be prevented by selecting an impedance with the same time constant as the stator coil 3 for the impedance $Z_3$.

The motor control described with reference to FIGS. 1 and 2 can also be obtained by interchanging the motor coil 3 and the impedance $Z_1$. Instead of a comparator K an operational amplifier with a sufficiently high gain factor may be selected.

If a two-phase motor is to be energized in accordance with the inventive method, the coils corresponding to these phases may be included in series or parallel in the circuit of FIG. 2 at the location of the stator coil 3. Owing to this series or parallel connection said two-phase motor then behaves as a single-phase motor and produces a pulsating torque. It is alternatively possible in the case of multi-phase motors to energize each phase winding individually with a circuit as shown in FIG. 2. The motor then behaves as a plurality of single-phase motors with a common spindle. The torque as a function of the rotor position $\varphi$ is then more uniform than in the case of a single phase motor. In the case of a two-phase motor the torque as a function of the rotor position $\varphi$ is then the sum of the two torque curves in accordance with FIG. 3e shifted through 90°.

In the case of single phase reluctance motors the problem occurs that there is no distinction between positive and negative currents. For a rotation voltage in accordance with FIG. 3b the output voltage of the comparator K should then be equal to $+V_B$ for $0 < \varphi < 180°$ and equal to 0 V for $180° < \varphi < 360°$. This may inter alia be achieved by connecting point 4 (FIG. 2) to $-V_B$ instead of to ground or by energizing the comparator K with 0 V and $+V_B$.

Since the stator coil is de-energized for $180° < \varphi < 360°$ no rotation voltage would be produced, because the rotor of a reluctance motor does not induce a voltage in the stator coil. As a result of this, the comparator K would not energize the bridge for $\varphi = 360°$. Therefore, a measuring current is to be applied to the stator coil 3, which may be effected by connecting the positive supply terminal $+V_B$ to the bridge via a resistor R, as shown dotted in FIG. 2.

For the impedances $Z_1$ and $Z_3$ resistors may be selected. The impedance $Z_2$ should then comprise an inductance. In practice this may give rise to problems since the impedance of the stator coil 3 may vary substantially because the temperature of the motor may rise appreciably.

FIG. 4 shows a single-phase synchronous motor with a winding divided into two sections and asymmetrical air gaps between stator and rotor. Around the stator lamination 2. This position makes an angle $\varphi_V$ with an rotor 1, which poles form asymmetrical air gaps with said rotor, two substantially identical windings 3 and 3' are provided. Owing to these asymmetrical air gaps the rotor assumes that position, with non-energized stator coils 3 and 3', in which the maximum flux of the permanent-magnetic rotor 1 is coupled around via the stator lamination 2. This position makes an angle $\phi_v$ with an the position which the rotor assumes with energized stator (rotor magnetisation in the direction of the axis 6). Owing to this asymmetry the motor always starts automatically upon energization of the coils 3 and 3'.

Since the zero passages of the rotation emf's produced in coils 3 and 3' occur when the coupled rotor flux is maximum and minimum, these zero passages appear when the rotor position is $\varphi_V$ and $\varphi_V + 180°$.

The flux of the permanent magnetic rotor 1 mainly flows via the stator lamination 2 and produces substantially identical rotation voltages in the coils 3 and 3'. However, a part of the rotor flux leaks away via the paths which bypass the coils 3 and 3' and does not contribute to the rotation emf's in the two coils 3 and 3'. This stray flux is not symmetrical relative to the line 12 owing to the asymmetrical air gaps, so that a measurable amplitude difference exists between the rotation voltages produced in the coils 3 and 3'.

Figure 5:
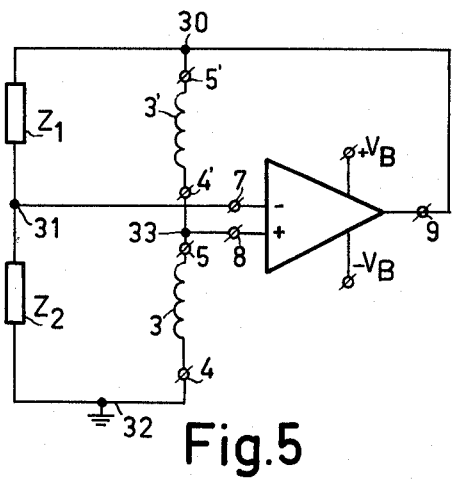

The motor in accordance with FIG. 4 may be energized with the circuit in accordance with FIG. 5. This circuit is essentially identical to the circuit in accordance with FIG. 2 but with the impedance $Z_3$ is constituted by the coil 3' of the motor. The two motor coil sections have been included with the same winding sense so that variations of the voltage at input 8 of the comparator K are determined by the said difference of the rotation electromotive forces.

When the bridge is substantially balanced, the difference between the rotation voltages produced in the two coil sections 3 and 3' appears across the inputs 7 and 8 of the comparator K. As said difference is unequal to zero, the motor, in a similar way to that of the motor in accordance with FIG. 1, can rotate in a self-commutating fashion commutation—at least at low speeds—is effected at the said angle $\varphi_V$ at which the zero passages of the two rotation voltages and consequently of the difference between these voltages appear.

The previously mentioned temperature coefficients of the motor coil impedance have no effect in this case because the temperature coefficients of the two motor coils in the bridge in accordance with FIG. 5 compensate for each other. For the impedances $Z_1$ and $Z_2$ resistors may be selected.

An additional yet important advantage is that owing to the energisation in accordance with the invention the single-phase motor of FIG. 4 exhibits a preferred direction. This may be explained as follows. If the rotor occupies an initial position as is shown in FIG. 4 ($\varphi = \varphi_V$) and if the initial energizing condition of the bridge is such that stator section 21 constitutes a northpole and the stator section 22 a southpole, the rotor 1 will be driven in the clockwise direction. Owing to the build-up of kinetic energy the rotor will pass through the angle $\varphi = 180°$ and overshoot said position beyond the angle $\varphi = 180° + \varphi_V$ where commutation takes place. Under these initial conditions the rotor will then be started in a clockwise direction.

If the rotor occupies an initial position at $\varphi_1 = \varphi_V + 180°$ and the initial energizing condition of the bridge is such that the stator section 21 constitutes a northpole and the stator section 22 constitutes a southpole, i.e. the opposite of the two previously mentioned initial conditions, the rotor will be attracted towards a stable position $\varphi = 180°$ and $\varphi = 0°$ respectively in an anticlockwise direction. As in passing through said position $\varphi = 180°$ and $\varphi = 0°$ the angle $\varphi = \varphi_V + 180°$ and $\varphi = \varphi_V$ respectively is not reached, no commutation will take place and the rotor will not be started.

In this way the motor of FIG. 4 energized in accordance with FIG. 5 can start in one direction only. In order to ensure that the motor starts in this direction in all cases, many methods are conceivable, two of which will be described by way of example hereinafter.

As was remarked in the description of the function of the capacitor C in the circuit of FIG. 2, the bridge can be brought into an unstable condition with the aid of an offset voltage so that the voltage across the bridge starts to oscillate. In the case of suitable initial conditions the rotor will start in the correct direction and a rotational difference voltage will be produced. If the offset voltage has been selected sufficiently small, said rotational difference voltage will soon overcome said offset voltage and the motor will keep rotating in the correct direction in a self-commutating fashion. When the initial conditions are just the wrong way around, the rotor will start to oscillate about the stable position with increasing amplitude owing to the bridge oscillations. An oscillation in the wrong direction has no effect, whereas an oscillation in the right direction will soon be sufficiently large to produce the desired commutation at $\varphi = \varphi_V$ (or $\varphi = \varphi_V + 180°$), after which the motor will continue to rotate in the desired direction in a self-commutating fashion.

A second possibility is to ensure that the correct initial conditions are obtained. If, for example, the initial condition of the bridge is always such that stator section 21 constitutes a northpole and stator section 22 constitutes a southpole, then by impressing on the bridge a voltage pulse of a polarity opposite to the polarity of the voltage across the bridge in accordance with the initial condition and of suitable duration, it is possible, to ensure that the rotor assumes the position in accordance with FIG. 4. If the stator section 21 constitutes a northpole and the stator section 22 a southpole, and the voltage at the output 9 of the comparator is positive, a negative voltage may for example be applied to the bridge terminal 30 via an (electronic) switch. Should the rotor occupy a position $\varphi = 180° + \varphi_V$, said rotor is oriented towards the position shown ($\varphi = \varphi_V$) relative to said negative voltage. If subsequently the bridge voltage is rendered positive, at least briefly, the rotor will be started and continue to rotate in a self-commutating fashion. It is also possible to ensure that the rotor always stops at the position $\varphi = \varphi_V$ with the aid of a permanent magnet.

The motor of FIG. 4, energized in accordance with FIG. 5, constitutes a very cheap and reliable self-commutating motor. Only two resistors and one operational amplifier suffice to convert the synchronous motor of FIG. 4 into a self-commutating d.c. motor, without the need of sensors and the like.

Figure 6:
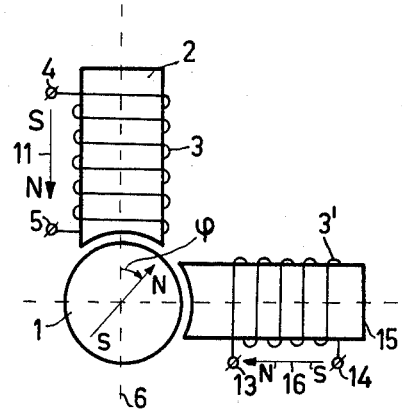

FIG. 6 schematically shows a two-phase motor. This motor comprises a first stator section 2 with a coil 3 and rotor 1 entirely in accordance and with FIG. 1 with the same the definition of the angle $\varphi$ and the winding sense. A second stator section 15 with a coil 3' has been shifted through an angle $\varphi = 90°$ relative to the first pole 2. The coil 3' has terminals 13 and 14.

Figure 7:
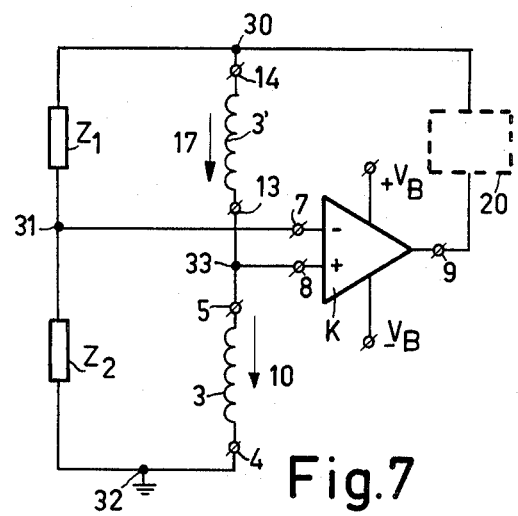

FIG. 7 shows an energizing circuit for a motor in accordance with FIG. 6. This energizing circuit corresponds to that of FIG. 2, with the proviso that the impedance $Z_3$ has been replaced by the coil 3'. The terminals 13 and 14 are connected to the non-inverting input 8 of the comparator K and to the output 9 of the comparator respectively. The winding sense is then such that when a current flows through coil 3' in the direction which is designated 17 in FIG. 7, the resulting field has a north-south direction, which is designated 16 in FIG. 6.

Figure 8:
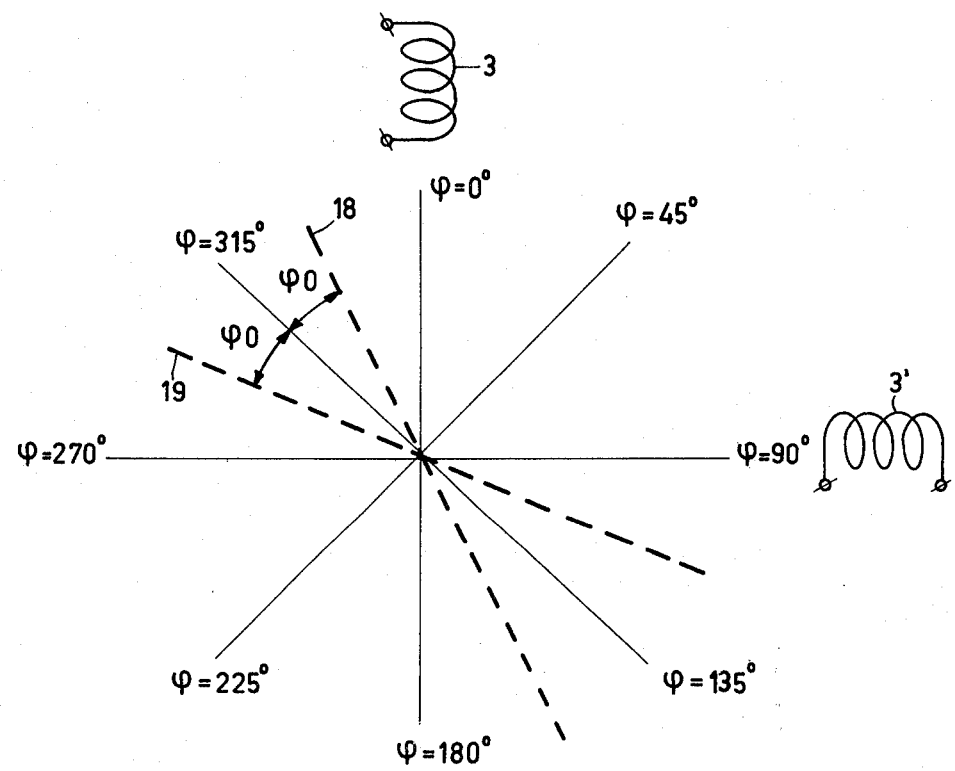

The operation of the circuit of FIG. 7 will be explained with reference to FIG. 8. This Figure shows a diagram in which the rotor position $\varphi$ has been plotted. The positions $\varphi = 0°$ and $\varphi = 90°$ are indicated, which also represent the direction of the fields of the stator poles with coils 3 and 3' respectively. Furthermore, the directions $\varphi = 45°, 135°, 138°, 225°, 270°$, and $315°$ are indicated.

As the coils 3 and 3' in the present example have the same winding direction and the same current passes through said coils when connected in series, the motor in respect of its energisation behaves as a single-phase motor having a stator pole with a coil at $\varphi = 45°$. The ideal commutation angles are then $\varphi = 45°$ and $\varphi = 225°$. As the rotation voltages produced as a function of the rotor position $\varphi$ differ 90° from each other and the circuit of FIG. 7 commutates if the two rotation voltages are equal, there will be commutation at $\varphi = 135°$ and $\varphi = 315°$, if time delays and the unbalance are neglected. When the circuit commutates at these angles $\varphi = 135°$ and $\varphi = 315°$, the motor can produce no torque. However, in practice, there are time delays, for example because owing to self-inductance it takes some time before the polarity of the current in coils 3 and 3' can change. The time delays result in a shift $\varphi_0$ of the commutation angle, which shift $\varphi_0$ is frequency dependent. As a result the commutation angle shifts towards the line 18 shown in FIG. 8 for a rotor which rotates in the clockwise direction, i.e. in the direction of the ideal commutation angle, so that the rotor can rotate in this direction and produce on average a positive torque. This angle shifts towards the line 19, i.e. in the opposite direction, for a rotor which rotates in the anticlockwise direction so that in this direction the rotor will produce a torque which is on the average negative. Consequently, the motor energized in accordance with FIG. 7 can rotate in the clockwise direction only. In order to ensure that it always starts in this direction, similar steps may be taken as in the circuit of FIG. 5. Reversal of the direction of winding of one of the two coils 3 and 3' results in a reversal in the direction of rotation.

The commutation angles can also be influenced electronically, for example, in order to facilitate starting or to influence the torque-speed curve of the motor in accordance with FIG. 6 using the energizing circuit of FIG. 7. This is also possible with of the other circuits that are possible in accordance with the invention. For this purpose the output signal of the comparator K may for example be transferred to the bridge with a time delay, for example by including a time delay circuit 20 (FIG. 7) in the output circuit of the comparator K. Such a delay circuit may be realized in various ways and, as the case may be, so as to be adjustable.

Figure 9:
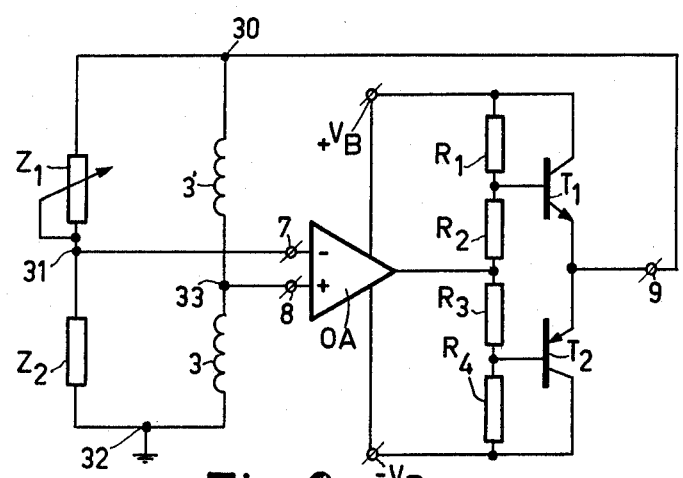
FIG. 9 shows an example of the circuit of FIG. 7 in more detail.

FIG. 9 shows an energizing circuit in accordance with FIG. 7 in detail. The impedance $Z_1$ is variable and the comparator comprises an operational amplifier OA whose output drives a class-B amplifier comprising transistors $T_1$ and $T_2$ and bias resistors $R_1$, $R_2$, $R_3$ and $R_4$. The output of the class-B amplifier constitutes the output of the comparator. Owing to the high gain of the operational amplifier OA this combination of operational amplifier and class-B amplifier functions as a comparator, and the output voltage at output 9 is switched from $+V_B$ to $-V_B$ and vice versa when the signals voltage between inputs 7 and 8 has a sufficiently high amplitude. In the present example the following components have been used:

$Z_1$: potentiometer with a maximum value of 100 kohms
$Z_2$: 82 kohm resistor
$R_1$: 3900 ohms
$R_2$: 6800 ohms
$R_3$: 6800 ohms
$R_4$: 3900 ohms
OA: TDA 0741
$T_1$: BD 263
$T_2$: BD 262
3, 3': motor windings, motor of type nr. ID 05 of N.V. Philips' Gloeilampenfabrieken
$\pm V_B: \pm 22V$.

Figure 10:
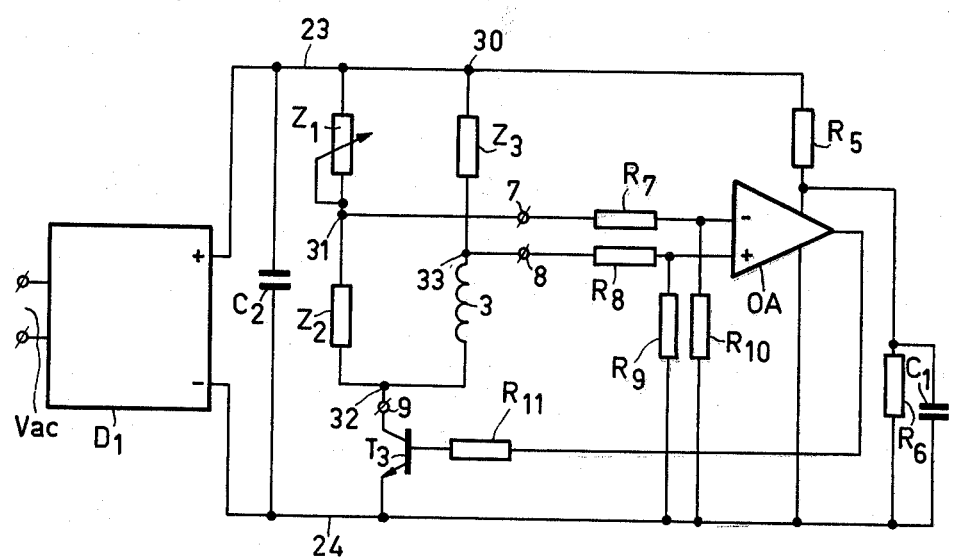
FIG. 10 shows an example of the circuit of FIG. 2 in more detail.

FIG. 10 shows an energizing circuit in accordance with FIG. 2 in more detail. The circuit comprises a bridge with a motor coil 3 in accordance with FIG. 2. The junction point between the impedances $Z_1$ and $Z_3$ is connected to a supply line 23 and the junction point between the impedance $Z_2$ and motor coil 3 is connected supply line 24 via a switching transistor $T_3$. The voltage across the supply lines 23 and 24 is obtained from the a.c. supply $V_{ac}$ via a bridge rectifier $D_1$ and a smoothing capacitor $C_2$, the supply line 23 being positive relative to the supply line 24. A voltage divider $R_5$, $R_6$ with a smoothing capacitor $C_1$ is included across the supply lines 23 and 24 for the low-voltage supply of an operational amplifier OA. The output of amplifier OA is connected to the base of the switching transistor $T_3$ via a resistor $R_{11}$. The junction point between impedances $Z_1$ and $Z_2$ is connected to the inverting input of the operational amplifier OA via a voltage divider $R_7$, $R_{10}$, and the point between the impedance $Z_3$ and the motor coil is connected 3 to the non-inverting input via a voltage divider $R_8$, $R_9$. The operational amplifier OA and the switching transistor $T_3$ thus constitutes the comparator K.

When the voltage at point 8 is sufficiently positive relative to the voltage at point 7, the output voltage of the operational amplifier OA bottoms transistor $T_3$ and the voltage between the supply lines 23 and 24 appears across the bridge. If the voltage at point 8 is negative relative to the voltage at point 7, transistor $T_3$ is cut off and the bridge is disconnected from the supply line 24. This method of energization is that which was said to be suitable for reluctance motors in the description with reference to FIGS. 1, 2 and 3. In the example of FIG. 10 this method of commutation is applied to a permanent magnetic motor. Symmetrical commutation, i.e. between $+V_B$ and $-V_B$ provides an improved motor operation but demands a symmetrical and thus complex power supply. For use in, for example, domestic appliances such as vacuum-cleaners, regular operation of the motor is not a main requirement and the simple power supply using one rectifier bridge and one capacitor is far more important.

The example of FIG. 10 has been realized with the following components.
$D_1$: BY 179
OA: TDA 0741
$T_3$: BU 208
$Z_1$: potentiometer with a maximum value of 500 kohms
$Z_2$: 47 kohm resistor.
$Z_3$: inductance of 10×the inductance of the motor coil 3.
3: stator coil of a single phase p.m. synchronous motor
$R_5$ : 22 kohms
$R_6$: 10 kohms
$R_7$: 100 kohms
$R_8$: 100 kohms
$R_9$: 10 kohms
$R_{10}$: 10 kohms
$R_{11}$: 2200 kohms
$C_2$: 2.2/$\mu$F
$C_2$: 10/$\mu$F
$V_{ac}$: 220 V, 50 Hz.

The inductance $Z_3$ may be constituted by a coil but also by a gyrator, for example the gyrator of the type number TCA 580 of N.V. Philips' Gloeilampenfabrieken, to be terminated with a capacitor.

The energizing circuit in accordance with the invention is extremely suitable for use in stepping motors. Stepping motors are driven stepwise in order to accomplish a specific displacement of the driven object in a very accurate manner or to be driven continuously may obtain a substantial displacement of said object with high speed. For the continuous drive the self-synchronizing energizing circuit in accordance with the invention can be used with success. An energizing circuit, for example in accordance with FIG. 1, may then be used for each phase of such a stepping motor. For a stepwise drive it suffices to apply pulses to the inputs of the comparator which dominate over the rotation voltage on these inputs, or to connect said inputs to a pulse generator via switches, instead of to the bridge. This last possibility is shown in FIG. 11.

Figure 11:
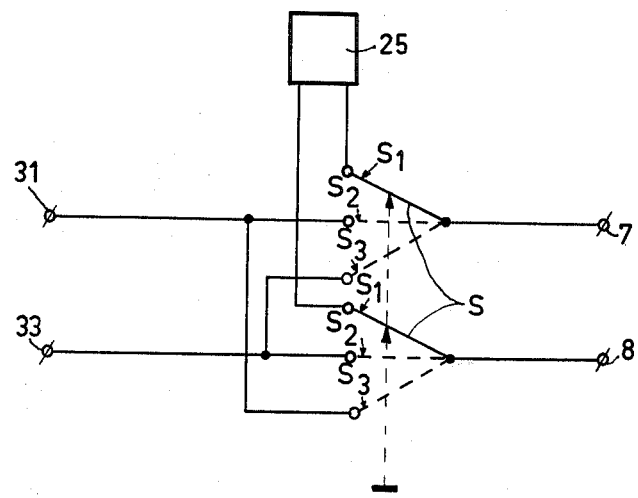
FIG. 11 illustrates a step which may be employed in the circuit arrangements in accordance with FIGS. 2, 5, 7, and 9.

FIG. 11 shows a circuit for replacing a direct connection between points 31 and 7 and points 33 and 8 shown in FIGS. 2, 5, 7, 9 and 10. This circuit comprises a double switch S with three positions $S_1$, $S_2$ and $S_3$. In positions $S_1$ switch S connects points 7 and 8 to a step control circuit 25. Said bridge is then disconnected from the comparator, which is controlled by circuit 25 so as to switch the voltage across the bridge. In position $S_2$ the situation is as is shown in FIGS. 2, 5, 7, 9 and 10 and the motor can rotate in a self-synchronizing fashion. In position $S_3$ point 31 is connected to point 8 and point 33 to point 7. In this position the voltage across the bridge will always have the wrong polarity for driving. The motor is then braked in a self-synchronizing manner.

For the energisation of stepping motors, circuits are available where pulses should be applied to the input in order to rotate the motor. Such a circuit can be used to advantage in conjunction with the circuit in accordance with the invention by including it between the comparator K and the bridge.

The energizing circuit in accordance with the invention can be used in conjunction with both permanent magnetic motors and reluctance motors. In the case of a reluctance motor the coils should always be energized and non-energized alternately because these motors are insensitive to the direction of the motor current. If desired, permanent magnet motors may also be energized in this manner.

Furthermore, it is always possible to interchange the elements in the bridge circuit crosswise. In the examples of FIGS. 5 and 7 the coil 3' and the impedance $Z_2$ may for example be interchanged.

It is obvious that the invention is not limited to the embodiments shown. Numerous variants to the principle described are possible.

We claim:

1. An elecctronically commutating motor comprising, a bridge circuit having a first impedance connected between a first point and a second point, a second impedance connected between the second point and a third point, a third impedance connected between the third point and a fourth point, and a fourth impedance connected between the fourth point and the first point, and comparator means having a first and a second input connected to the second and the fourth point, respectively, for comparing the voltages at the second and the fourth points, and having an output for energizing the bridge circuit between the first and the third points as a function of an output signal at said output of said comparator means, and wherein at least one of the first and third impedances comprises a stator phase winding of the motor.

2. An electronically commutating motor as claimed in claim 1 wherein the motor comprises a rotor and a stator having at least one pole pair that provides asymmetrical air gaps between the stator and rotor, and wherein each pole of said pole pair is provided with a winding, the first or third impedance comprising the one winding and the second or fourth impedance the other winding.

3. An electronically commutating motor as claimed in claim 1 wherein the motor comprises a two-phase motor having first and second phase windings, the first or third impedance comprising the first phase winding and the second or fourth impedance comprising the second phase winding.

4. An electronically commutating motor as claimed in claims 1, 2 or 3 wherein the motor comprising a reluctance motor and said comparator means is arranged to energize the bridge circuit so that in the stationary condition of the motor an energizing voltage appears across the bridge if the voltage between the fourth and second point exhibits a first polarity and so that the bridge is non-energized in the stationary condition if the voltage across the fourth and second point exhibits a second polarity.

5. An electronically commutating motor as claimed in claim 4 further comprising means connecting the bridge circuit to a voltage-carrying terminal via a resistor in such a way that the phase windings included in the bridge circuit receive a measuring current when the bridge circuit is non-energized.

6. An electronically commutating motor as claimed in claims 1, 2, or 3 wherein the comparator means comprise a time delay device for transferring said output signal to the bridge circuit with a time delay.

7. An electronically commutating motor as claimed in claim 6 wherein the time delay device produces a variable time delay.

8. An electronically commutating motor as claimed in claims 1, 2 or 3 further comprising motor is braked in a self-synchronizing fashion.

9. An electronically commutating motor as claimed in claim 8 wherein said switching means comprises a cross-over switch connected between the second and fourth point and the first and second input of the comparator means for cross-wise interchanging the connections between the second and the fourth point and the first and the second input of the comparator means, respectively.

10. An electronically commutating motor as claimed in claims 1, 2 or 3 further comprising means for controlling the energizing voltage across the bridge circuit independently of the voltage between the second and the fourth points.

11. An electronically commutating motor as claimed in claim 10 wherein said signal control means comprise a switch for interrupting the connection between the second and the fourth points and the first and the second inputs of the comparator means, respectively, and for connecting said first and second inputs to a control circuit for controlling the energizing signal across the bridge circuit.

12. A control circuit of electronically commutating a motor comprising, a bridge circuit having first and third input terminals and second and fourth output terminals, first and second impedances serially connected between the first and third terminals with a junction therebetween forming said second output terminal, third and fourth impedances serially connected between the first and third terminals with a junction therebetween forming said fourth output terminal, a comparison device having first and second input terminals connected to the second and fourth bridge output terminals for comparing a voltage appearing thereat, said comparison device having output means, means coupling said first and third bridge input terminals across the comparison device output means so that the bridge circuit is energized by an output signal produced at the comparison device output means, and means for coupling the bridge circuit to the motor so that at least one of said first and third impedances comprises a stator winding of the motor.

13. A control circuit as claimed in claim 12 for commutating an AC motor that comprises a rotor and a stator having a pole pair arranged to provide an asymmetrical air gap between the rotor and stator, each pole of said pole pair having a stator winding thereon, and wherein said coupling means couples the bridge circuit to the motor so that one stator winding comprises the first or third impedance and the other stator winding comprises the second or fourth impedance of the bridge circuit.

14. A control circuit as claimed in claim 12 for commutating a two-phase AC motor having first and second stator phase windings, and wherein said coupling means couples the bridge circuit to the motor so that the first stator winding comprises the first or third impedance and the second stator winding comprises the second or fourth impedance of the bridge circuit.

15. A control circuit as claimed in claim 12 wherein the comparison device produces an output signal of one polarity when the voltage at its first input exceeds the voltage at its second input and produces an output signal of opposite polarity when the voltage at its second input exceeds the voltage at its first input, and the comparison device switches therebetween upon equality of the voltages at its first and second inputs, and wherein rotation of the motor induces an alternating voltage in said motor stator winding of sufficient amplitude to switch the comparison device.

* * * * *